United States Patent
Arnold

(10) Patent No.: US 9,851,125 B2
(45) Date of Patent: Dec. 26, 2017

(54) TRANSPORTABLE DEVICE FOR HEATING FOODSTUFFS, AND A TRANSPORTABLE HEATING ELEMENT

(71) Applicant: Uwe Arnold, Ludwigshafen (DE)

(72) Inventor: Uwe Arnold, Ludwigshafen (DE)

( * ) Notice: Subject to any disclaimer, the term of this patent is extended or adjusted under 35 U.S.C. 154(b) by 293 days.

(21) Appl. No.: 14/427,907

(22) PCT Filed: Sep. 13, 2013

(86) PCT No.: PCT/EP2013/069019
§ 371 (c)(1),
(2) Date: Mar. 12, 2015

(87) PCT Pub. No.: WO2014/044609
PCT Pub. Date: Mar. 27, 2014

(65) Prior Publication Data
US 2015/0241089 A1    Aug. 27, 2015

(30) Foreign Application Priority Data
Sep. 19, 2012    (EP) .................................... 12185093

(51) Int. Cl.
*F24J 1/00*    (2006.01)
*A47J 36/28*   (2006.01)
(Continued)

(52) U.S. Cl.
CPC ............... *F24J 1/00* (2013.01); *A45C 5/02* (2013.01); *A45C 11/20* (2013.01); *A45C 15/00* (2013.01); *A47J 36/28* (2013.01); *B65D 81/3484* (2013.01)

(58) Field of Classification Search
CPC .. A21B 1/52; A45C 5/02; A45C 11/20; A45C 15/00; A45C 2200/20;
(Continued)

(56) References Cited

U.S. PATENT DOCUMENTS 3,942,510 A * 3/1976 Garrett .................... A47J 36/28
126/263.05
4,762,113 A * 8/1988 Hamasaki .......... B65D 81/3484
126/261
(Continued)

FOREIGN PATENT DOCUMENTS

DE    10 2008 015677 A1    10/2009
DE    20 2010 015079 U1    1/2011
(Continued)

OTHER PUBLICATIONS

International Preliminary Report on Patentability and Written Opinion of the International Searching Authority of International Application No. PCT/EP2013/069019 dated Mar. 24, 2015, 15 pages (with English Translation).
(Continued)

*Primary Examiner* — Gregory Huson
*Assistant Examiner* — Daniel E Namay
(74) *Attorney, Agent, or Firm* — Fay Sharpe LLP

(57) ABSTRACT

A transportable device for heating foodstuffs includes a container for receiving the foodstuff as well as a closed-off heating chamber which adjoins the container and is thermally coupled thereto while simultaneously being hermetically separated therefrom via a shared, thermally-conductive wall. The heating chamber includes a first chamber and a second chamber that are separated by a water vapor-permeable wall. In the first chamber is a substance or a substance mixture which, when a liquid, preferably water, is supplied, generates heat in an exothermic chemical reaction with water vapor being formed. In the second chamber, a zeolite is located which can adsorb the water entering from the first chamber via said water vapor-permeable wall, generating heat. A transportable heating element which can be used in (Continued)

the device contains a hermetically-sealed heating chamber that adjoins a thermally-dissipating outer wall.

31 Claims, 2 Drawing Sheets

(51) Int. Cl.
  *A45C 11/20*    (2006.01)
  *B65D 81/34*    (2006.01)
  *A45C 5/02*     (2006.01)
  *A45C 15/00*    (2006.01)
  *F24C 1/16*     (2006.01)
  *A61F 7/03*     (2006.01)

(58) Field of Classification Search
  CPC ... A45C 2200/0583; A47J 26/28; A47J 27/04;
    A47J 27/10; A47J 36/28; A47J 37/01;
    A47J 37/0623; A47J 37/0664; A61F 7/03;
    B65D 81/3484; B65D 81/00; F24C 1/16;
    F24C 9/00; F24C 15/18; F24H 1/0045;
    F24H 1/06; F24J 1/00
  USPC .... 126/263.01, 273.5, 29, 5, 33, 20; 99/339,
    99/450
  IPC ............. A21B 1/52; A45C 11/20; A47J 36/28;
    B65D 81/34; F24C 1/16,9/00,
    15/18
  See application file for complete search history.

(56) References Cited

U.S. PATENT DOCUMENTS

| | | | | |
|---|---|---|---|---|
| 5,857,470 A * | 1/1999 | Schmidt | ................. | A45D 2/365 |
| | | | | 132/211 |
| 6,029,651 A * | 2/2000 | Dorney | ................... | A47J 36/30 |
| | | | | 126/263.01 |
| 6,141,970 A * | 11/2000 | Molzahn | ................. | A23G 9/00 |
| | | | | 126/263.01 |
| 6,199,558 B1 * | 3/2001 | Schmidt | ................. | A45D 2/365 |
| | | | | 132/211 |
| 7,652,228 B2 * | 1/2010 | Igaki | ....................... | A61F 7/034 |
| | | | | 126/204 |
| 8,001,959 B2 * | 8/2011 | Ford | .................... | B65D 17/163 |
| | | | | 126/263.01 |
| 8,539,777 B2 * | 9/2013 | Henry | ....................... | F25D 5/02 |
| | | | | 126/263.01 |
| 2002/0104527 A1 * | 8/2002 | Ichikawa | ................. | A47J 36/28 |
| | | | | 126/263.05 |
| 2007/0221197 A1 * | 9/2007 | Sevim | ................ | B65D 81/3484 |
| | | | | 126/263.09 |
| 2008/0017184 A1 * | 1/2008 | Marshall | ........... | B65D 81/3484 |
| | | | | 126/263.01 |
| 2009/0199843 A1 * | 8/2009 | Farone | .................... | A47J 36/28 |
| | | | | 126/263.09 |
| 2010/0078440 A1 * | 4/2010 | Bargan | ....................... | F24J 1/00 |
| | | | | 220/592.2 |
| 2010/0224510 A1 * | 9/2010 | Ford | ...................... | B65D 51/20 |
| | | | | 206/219 |
| 2012/0030992 A1 * | 2/2012 | Bommaraju | ........... | A47J 36/28 |
| | | | | 44/253 |
| 2012/0031390 A1 * | 2/2012 | Coffey | ................... | A47J 36/28 |
| | | | | 126/263.01 |
| 2012/0193367 A1 * | 8/2012 | Baker | ....................... | F24J 1/00 |
| | | | | 220/592.22 |
| 2012/0231138 A1 * | 9/2012 | Poston | ..................... | F23D 3/08 |
| | | | | 426/520 |
| 2015/0017287 A1 * | 1/2015 | Sevim | ................ | B65D 81/3484 |
| | | | | 426/109 |

FOREIGN PATENT DOCUMENTS

| | | | | |
|---|---|---|---|---|
| EP | 0244837 A1 * | 11/1987 | ............. | A47J 36/30 |
| EP | 1 126 004 A1 | 8/2001 | | |
| FR | 2361281 A1 * | 3/1978 | ............. | A47J 36/28 |
| JP | 57-038597 | 3/1982 | | |
| JP | 04072169 A * | 3/1992 | ................ | F24J 1/00 |
| JP | 199125760 | 11/1992 | | |
| JP | 11-051657 | 2/1999 | | |
| JP | 2001171755 A * | 6/2001 | ............. | A47J 36/28 |
| JP | 2001314326 A * | 11/2001 | | |
| JP | 2008035919 A * | 2/2008 | | |
| JP | 2008089214 A * | 4/2008 | | |
| WO | WO 2007059122 A1 * | 5/2007 | ........... | B65D 17/163 |

OTHER PUBLICATIONS

International Search Report of International Application No. PCT/EP2013/069019 dated Dec. 3, 2013, 4 pages.

\* cited by examiner

TRANSPORTABLE DEVICE FOR HEATING FOODSTUFFS, AND A TRANSPORTABLE HEATING ELEMENT

BACKGROUND

The invention relates to a transportable apparatus for heating food, which includes a container for receiving the food and a heating space adjoining the container, which is thermally coupled to the container by means of a common thermally-conductive wall and at the same time is separate from it and which contains a substance or a mixture of substances, which, when a liquid, particularly water, is supplied produces heat in an exothermic chemical reaction. The invention further relates to a transportable heating device, which is usable, for instance, in the aforementioned transportable apparatus for heating food.

A mixture of substances, which includes calcium oxide (CaO) and aluminum powder (Al) is disclosed, for instance, in Patent Specification EP 1126004 B1. When water is supplied, a multi-stage chemical reaction occurs, in which, on the one hand, the calcium oxide is converted with the water into calcium hydroxide with the generation of heat and in which the calcium hydroxide then reacts with the aluminum to form calcium aluminate and hydrogen, whereby further heat is produced. Temperatures of 90° C. and more may be achieved with such a mixture of substances, though it should be noted that at temperatures above 100° C. steam is additionally produced from a proportion of the water. If the reaction takes place in a closed container, the high gas pressure at temperatures above 100° C. can result in bursting of the container. Only heating to below 100° C. is therefore performed with the heating mixture proposed in the publication.

A further mixture of substances for producing heat is disclosed in DE 102008015677 A1 or in DE 202010015079 U1.

DE 202010015079 U1 discloses a container with a first receiving space for a consumable product, which is surrounded by a second receiving space, which contains a sorbent material, e.g. zeolite. The second receiving space is surrounded by a third receiving space, in which a liquid, e.g. water, is situated. The wall between the third and second receiving spaces may be ruptured such that the liquid can enter from the third receiving space into the second receiving space. The sorbent absorbs water, whereby heat is produced, which heats the product in the first receiving space. The mixing of the water, which enters the second chamber only at a few points, with the sorbent during the onset of the sorption reaction is problematic with this structural design.

In DE 102008015677 A1 a zeolite granulate and a water-containing bag are located in a closed bag. In order to produce the heat, the water bag is firstly induced to burst, whereafter the water distributes itself within the surrounding bag and acts on the zeolite granulate. The zeolite absorbs the water, whereby heat is produced. It is of disadvantage with the arrangement proposed therein that firstly a speedy distribution of the water within the bag must be achieved, which is supposed to be achieved, for instance, by water-conducting additional layers of an absorbent material. Specifically, if the water is not distributed instantaneously in the bag, it reacts initially only with the adjacent particles of the zeolite granulate, whereby this mixture then forms a barrier, which impedes further distribution of the water. The heat production is thus in turn reduced.

It is therefore the object of the invention to provide a transportable apparatus for heating food or a transportable heating device, in which the disadvantages of the prior art referred to above are avoided and high temperatures above 100° C. can be achieved, without hot vapors or unpleasant odors leaving the heating space.

This object is solved in accordance with the invention by a transportable apparatus with the features of claim 1. This object is further solved by a transportable heating device with the features of claim 20.

BRIEF SUMMARY

The transportable apparatus for heating food includes a container for receiving the food and an enclosed heating space adjoining the container. The heating space is thermally coupled to the container by a common thermally conductive wall and at the same time hermetically separated from it. The heating space includes a first chamber and a second chamber, which are separated by a steam-permeable wall. Located in the first chamber is a substance or a substance mixture, which, when a liquid, which, for instance, is or includes water, is supplied generates heat in an exothermic chemical reaction, whereby steam is formed. Located in the second chamber is an adsorption agent, for instance zeolite (for instance in the form of a granulate, a powder or a porous pressed body), which can adsorb the water entering from the first chamber via the steam-permeable wall (in the form of steam) whilst generating heat. In order that the adsorption agent, particularly the zeolite, can perform this function, it must of course be free of water or at least low in water. The steam-permeable wall is to be interpreted in this case as any separating device which, on the one hand, permits steam from the first chamber through into the second chamber but which, on the other hand, substantially prevents the passage of the substances from the one chamber into the other (particularly before the beginning of the exothermic reaction), that is to say, for instance, a steam-permeable, continuous fabric or a steam-permeable film, but also an inherently impermeable wall, which is provided with one or more openings, wherein the openings must be so constructed (correspondingly small size or insertion of tubes projecting into a chamber) that the passage of the substance is substantially prevented.

The invention is based on the central idea that in the heating space a chemical, exothermic reaction is combined in an optimum manner with a physical, exothermic reaction so that the gases produced in the chemical reaction are at least partially adsorbed in the physical, exothermic reaction such that the pressure can be maintained below the maximum pressure which could result in bursting of the wall. It is thus possible to seal the heating space with respect to the environment. An overpressure valve can be provided in the wall of the heating space only for extreme circumstances. A further result of the division into the chambers is that the liquid, for instance the water, is initially used primarily for the exothermic, chemical reaction and substantially only the steam which is produced is available for the exothermic, physical reaction. When reference is made herein to a first chamber and a second chamber, this is intended also to include those cases in which a plurality of first and/or second chambers are provided.

The thermally conductive wall is preferably situated on at least a proportion of the underside of the container. This facilitates the supply of heat. The thermally conductive wall is preferably a metal wall. In this connection, in particular, an economical metal wall, for instance of tinplate, can be provided, whereby the entire container can be formed of this material.

In a preferred embodiment, the second chamber is arranged above at least a proportion of the first chamber such that the underside of the second chamber is situated above the reaction mixture, produced after the supply of the water, in the first chamber (which generally takes up a higher volume in the first chamber than the substance mixture previously). It may thus advantageously be prevented that the liquid, particularly water, passes before the reaction with the substance or the substance mixture in the first chamber to a substantial extent through the steam-permeable wall into the second chamber. Preferably, the second chamber is arranged beneath the container and the first chamber is arranged beneath the second chamber and the first chamber, the second chamber and the base of the container constituting the thermal conductive wall are of about the same horizontal extent. The first chamber and the second chamber are preferably of a height which is about 3 to 30% of the external dimensions of the base of the container. This means that a flat heating space is defined, which takes up a small volume and enables a good thermal transfer to the container. In another embodiment, the second chamber can be arranged above the first chamber in the shape of a ring such that a central region of the first chamber and a ring-shaped region surrounding the central region of the second chamber adjoin a base of the container constituting the thermally conductive wall. In this embodiment, the heat generated in the first chamber is delivered at least partially directly to the container base, which results in a more rapid heating up of the container. Depending on the substance or the substance mixture used for the exothermic chemical reaction and depending on the material of the container and, particularly, on the material of the thermally conductive wall, it can be advantageous not to permit the first chamber to directly adjoin the thermally conductive base of the container because substances in the substance mixture could possibly react with the metal of the container base. The choice of the structural alternatives thus depends particularly on the choice of the substance or the substance mixture and the container materials which are used.

In an advantageous embodiment of the apparatus in accordance with the invention, the steam-permeable wall is constituted by a textile fabric, particularly a non-woven fabric. This should be of a thickness and fiber density which enables a rapid passage of the steam but on the other hand ensures sufficient mechanical security of separation. It is also possible to select a multilayer wall construction, in which the properties of the wall alter in the course of the reaction. It can, in particular, be advantageous in this case that the wall is initially liquid-tight so that the liquid introduced into the first chamber cannot penetrate into the second chamber and is completely available for the chemical reaction. The wall can include a layer, which either dissolves in the liquid, e.g. in water, or melts under the action of heat. If the liquid or the heat generated in the first chamber then acts on this layer, which is preferably situated on the underside of the steam-permeable wall, it dissolves or melts, which then permits the passage of the liquid, for instance the water, and of the steam. A second layer arranged behind the dissolving or melting layer then serves merely to mechanically separate the two chambers. The steam-permeable wall can, for instance, consist of a combination of a water-soluble film with a non-woven textile, filter paper or also metal wire arranged above it.

In an advantageous embodiment, the textile fabric of the steam-permeable wall is provided on the side directed towards the first chamber with a liquid-repellent coating or rendered water-resistant. This results in a delayed access of the liquid, for instance the water, into the second chamber so that the liquid is initially more fully available for chemical reaction in the first chamber.

The liquid used for the chemical reaction can either be previously deposited in the transportable apparatus or it can be supplied via an opening from the exterior of the first chamber. An advantageous embodiment is characterized in that a third chamber containing the liquid, for instance water, is provided, which is separated from the first and second chambers, whereby a device for producing a connection introducing the liquid from the third chamber into the first chamber is provided. The third chamber is preferably arranged adjacent to the first chamber and separated from it by a liquid-tight wall. The device for producing a connection introducing the liquid from the third chamber into the first chamber includes, for instance, a device for producing an opening in the liquid-tight wall.

In a further advantageous embodiment, an outer wall of the first chamber includes a re-closable opening for introducing the liquid. The re-closable opening can include, for instance, an automatically closing valve of an elastic material. It is possible in this embodiment that the liquid can be accommodated by a metering device, for instance a piston injector, whereafter the metering device (i.e. the sprayer) is coupled to the re-closable opening and the liquid is injected through the opening, whereafter the opening closes again.

In a preferred embodiment of the transportable apparatus for heating food, the substance of the substance mixture generates, when liquid is supplied, further reaction gases (such as hydrogen) in addition to the steam in an exothermic chemical reaction, wherein the wall is also permeable to these further reaction gases and wherein the reaction gases are also adsorbed by the zeolite, preferably also in an exothermic reaction.

A preferred embodiment is characterized in that the substance in the first chamber is calcium oxide or the substance mixture in the first chamber includes calcium oxide. The substance mixture preferably additionally contains aluminum powder or granulate. In a preferred embodiment, the substance mixture can further include sodium carbonate or potassium carbonate.

In preferred embodiments, the transportable apparatus is characterized in that the heating space and at least one adjacent portion of the container are surrounded by a thermally insulating wall. Undesired heat dissipation into the environment is thus reduced.

The transportable heating device in accordance with the invention includes a hermetically sealed heating space adjoining a thermally transmissive outer wall. The heating space includes a first chamber and a second chamber. The two chambers are separated by a steam-permeable separating device. Located in the first chamber is a substance or a substance mixture, which, when liquid is supplied, generates heat in an exothermic, chemical reaction, whereby steam is formed. Preferably, the liquid is or includes water. Located in the second chamber is an adsorption agent, preferably a zeolite, which can adsorb the water entering from the first chamber via the steam permeable separating device in the form of steam whilst generating heat. Such a heating device, which can be of rigid or flexible construction, finds application, for instance, in the transportable apparatus for heating food described above. Such a heating device can also find application as a component of a heated cushion or another device for heating or warming to be used independently of power connections or other circumstances at the location of use, such as, for example, in heatable shoe inserts or also as a heating device, which can be immersed in a liquid which is to be heated.

In a further embodiment of the invention, the transportable heating device is of substantially laminar construction in that it has a smaller dimension in a direction perpendicular to a flat or curved surface than in this surface. The first and/or second chamber extends substantially parallel to the flat or curved surface over the entire or a predominant proportion of the heating device. A preferred embodiment is characterized in that the second chamber extends substantially parallel to the flat or curved surface over the entire or a predominant proportion of the heating device and the thermally transmissive outer wall is a wall of the second chamber. These laminar embodiments are suitable, in particular, for insertion into a pizza box or for heated cushions or shoe inserts.

In one embodiment, the steam-permeable separating device includes a steam-permeable common wall of the first chamber and the second chamber. The steam-permeable wall is preferably constituted by a textile fabric, particularly a non-woven fabric. This should be of a thickness and fiber density which enables a rapid passage of the steam but on the other hand ensures sufficient mechanical separation security. It is also possible to select a multilayer wall construction, in which the properties of the wall alter in the course of the reactions. It can, in particular, be advantageous in this connection that the wall is initially liquid-tight so that the liquid introduced into the first chamber cannot penetrate into the second chamber and is completely available for the chemical reaction. The wall can include a layer, which either dissolves in the liquid, e.g. in water, or melts under the action of heat. If the liquid or the heat generated in the first chamber then acts on this layer, which is preferably located on the underside of the steam-permeable wall, it thus dissolves or melts, which then permits the passage of the liquid, for instance the water, and the steam. A second layer arranged behind the dissolving or melting layer then serves only to mechanically separate the two chambers. The steam-permeable wall can, for instance, consist of a combination of a water-soluble film with a non-woven fabric, filter paper or metal wires arranged above it.

In another embodiment, the steam-permeable separating device includes at least one opening in a common separating wall of the first chamber and the second chamber. For instance, a plurality of openings arranged in the common separating wall is provided, wherein their size is so dimensioned that the substance or the substance mixture and/or the adsorption agent cannot pass over from the one chamber to the other. In an alternative or additional embodiment, each of the at least one openings arranged in the common separating wall is connected to a guiding device, for instance a tube, deflecting the steam at a predetermined location in the second chamber.

In a preferred embodiment of the heating device in accordance with the invention, a third chamber containing the liquid is provided, which is separated from the first and the second chambers, wherein a device for producing a connection introducing the liquid from the third chamber into the first chamber is provided. The third chamber is preferably arranged adjacent to the first chamber and separated from it by a liquid-tight wall and the device for producing a connection introducing the liquid from the third chamber into the first chamber includes a device for producing an opening in the liquid-tight wall.

Alternatively, the transportable heating device is characterized in that an outer wall of the first chamber includes a re-closable opening for introducing the liquid. It is possible in this embodiment that the liquid can be received by a metering device, for instance a piston injector, whereafter the metering device (i.e. the injector) is coupled to the re-closable opening and the liquid is injected through the opening, whereafter the opening again automatically closes.

In one embodiment, the transportable heating device is provided for use in a predetermined position. In this position, the second chamber is arranged above at least a portion of the first chamber such that the underside of the second chamber is situated above the reaction mixture, which is produced after supply of the liquid, in the first chamber. This is of advantage particularly when used in a heatable box for baked goods (e.g. pizza) or also with a heatable seat surface.

Advantageous and/or preferred embodiments of the invention are characterized in the dependent claims.

BRIEF DESCRIPTION OF THE DRAWINGS

The invention will be explained in more detail below with reference to preferred exemplary embodiments illustrated in the drawings, in which.

DETAILED DESCRIPTION

Figure 1:
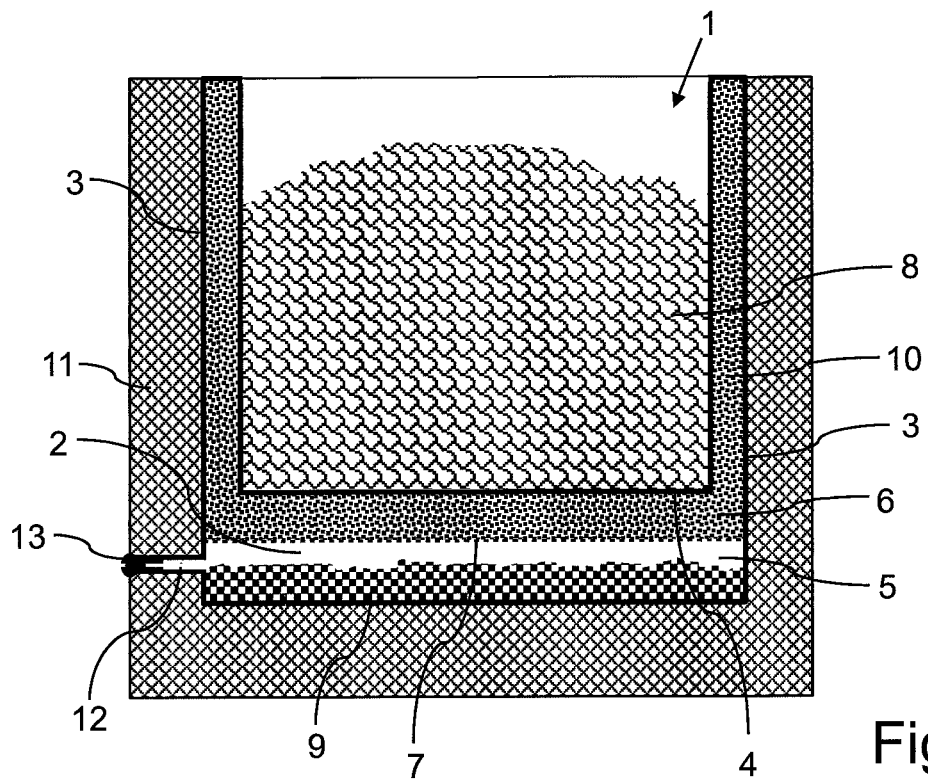
FIG. 1 is a schematic sectional view of a first embodiment of the transportable apparatus in accordance with the invention for heating food.
Figure 2:
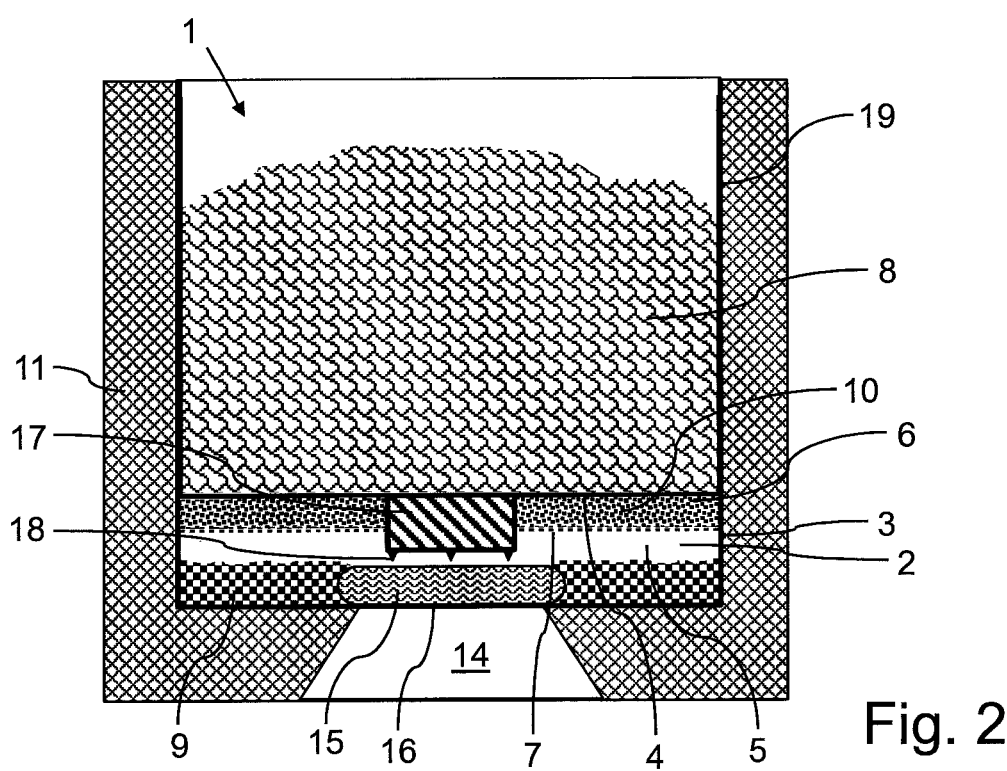
FIG. 2 is a schematic sectional view of a second embodiment of the transportable apparatus in accordance with the invention.
Figure 3:
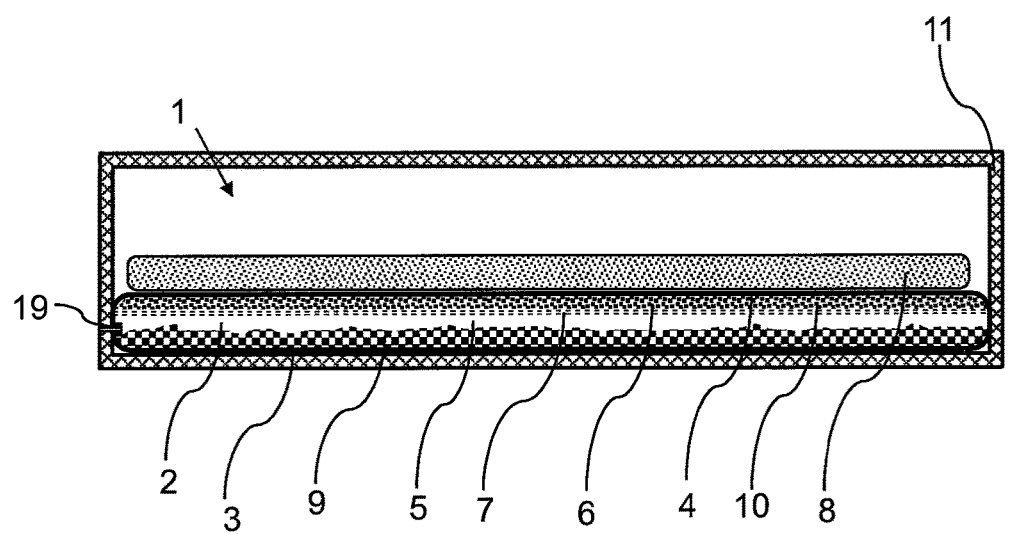
FIG. 3 is a schematic sectional view of a third embodiment of the transportable apparatus in accordance with the invention.

FIGS. 1 to 3 are schematic sectional views of three preferred exemplary embodiments of the transportable apparatus in accordance with the invention for heating food. The shape of the container and the shape, matched to it, of the heating space are guided by, amongst other things, the nature of the food to be heated. The food can, for instance, constitute liquids, such as beverages or soups. In this event temperatures below the boiling temperature of 100° C. occur. However, by reason of the fact that temperatures above 100° C. can be produced with it, the transportable apparatus in accordance with the invention is suitable, in particular, also for those foods which are not only to be heated but with which the heating process serves as preparation, and which thus are, for instance, to be baked. During the heating procedure, processes are thus to occur in the foods which convert the food into a palatable state. Such processes include, in particular, the final baking of pre-baked pastries.

FIG. 1 shows a first preferred embodiment of the transportable apparatus. Situated in a container 1, which is shown in section, there is a foodstuff, for instance a portion of dough for a pastry to be baked. Arranged around the container 1 is a heating space 2, which is closed on all sides. The container 1 together with the heating space 2 forms in this case a double-walled vessel. The heating space 2 is thermally coupled to the container via the common thermally conductive wall 4. Disposed around the outer wall 3 of the heating space 2 is a thermal insulation layer 11. The heating space 2 is divided by the wall 7 into a lower, first chamber 5 and an upper, second chamber 6. Situated in the lower, first chamber 5 there is a substance mixture 9, which, when water is supplied, produces heat in an exothermic, chemical reaction, whereby steam is formed. In order to enable the supply of water into the first chamber 5, the transportable apparatus shown in FIG. 1 has an opening 12 (for instance in the form of a thin pipe), which is closed by an automatically closing valve 13, for instance of an elastic material. This type of closure is comparable with the valve of an inflatable ball. In order to enable the introduction of the water into the lower chamber 5, the substance mixture 9 does not take up the entire volume of the first chamber 5, as shown in FIG. 1. There is instead an empty volume remaining above the substance mixture 9 in the chamber 5. This empty volume can be, for instance, wholly or partially evacuated. Such evacuation of the volume enables simple injection of the necessary amount of water through the opening 12 as a result of the reduced pressure. For this purpose, a hollow needle (not shown in FIG. 1), for instance, of an injector device filled with predetermined volume of water is pushed through the valve 13 into the opening 12. The predetermined volume of water is then emptied into the chamber 5, whereafter mixing of the water with the substance mixture 9 can take place.

The upper, second chamber 6 is filled with a zeolite granulate. A pressed body of zeolite granulate or (less preferred) a powder can also be used instead of the granulate.

In this and the other embodiments, the substance mixture 9 is preferably a mixture of calcium oxide and aluminum, whereby both substances are preferably mixed together in powder form. In a preferred mixture, a predetermined amount of the calcium oxide is mixed with approximately the same amount to about four times as much of the aluminum powder. A small amount of sodium carbonate (for instance ⅓ of the amount of the calcium oxide) can additionally also be added. The amount of the water added is preferably 1.5 to 2.5 times the volume of the powder mixture, preferably about twice the volume of the powder mixture.

In order to heat the food 8 in the container 1, one proceeds as follow. A predetermined amount of water is injected through the opening 12 into the lower chamber 5. After withdrawing the needle of the injector device, the opening 12 is closed automatically by the valve 13. The water mixes in the chamber 5 with the powder mixture 9 and an exothermic chemical reaction begins, which results in heating of the mixture in the chamber 5. In the course of this chemical reaction and the accompanying heating, gases are produced such as, for instance, hydrogen and steam in the case of a powder mixture of calcium oxide and aluminum. The heat which is produced rises to the base of the container. At the same time, the steam and the other gases which are produced pass through the wall 7 and encounter the zeolite 10 in the chamber 6. The zeolite adsorbs the steam and the gases which enter, whereby additional heat is liberated. In addition, a proportion of the water from the chamber 5 can also reach the chamber 6, where it is also adsorbed with the generation of heat by the zeolite. The heat produced in the lower chamber 5 and the upper chamber 6 heats the container 1 and the food 8 located in it. The thermally-insulating jacket 11 ensures that the heat losses are low. As a result of the heating of the water and the hot reaction gases which are produced, the pressure in the heating space 9, which is surrounded on all sides by walls. 3, 4, rises. The heating space 2 must resist this pressure. The pressure is then in turn reduced by the adsorption of the gases in the zeolite. The amount used of the zeolite 10 contained in the chamber 6 must be matched to the amounts used of the substance mixture and of the water so that the pressure does not exceed a maximum pressure during the entire process.

The vapor permeable wall must be so constructed that it ensures, at least initially, that the predominant proportion of the water which is introduced remains in the first chamber 5 in order to react therein with the substance mixture 9. At the same time, the wall must render it possible that the steam generated in the chamber 5 and the gaseous reaction products which are produced therein are conducted rapidly into the chamber 6. A thin non-woven fabric, for instance, can be used as the wall 7, which is coated on its bottom side with a water-repellent layer. Other fabrics of textile fibers, plastic material or metal could also be used instead of the non-woven fabric.

FIG. 2 shows a second embodiment of the transportable apparatus in accordance with the invention for heating food. In the embodiment of FIG. 2, the heating chamber 2 is arranged only under the container 1 with the food 8. The side wall 19 of the container 1 is surrounded externally only by the thermally insulating wall 11. The heating space 2 is again divided into a lower, first chamber 5 and an upper, second chamber 6, between which there is a steam-permeable wall 7. The zeolite is located in the upper chamber 6. Located in the lower chamber 5 is the substance mixture 9 and a third chamber 15 is also arranged therein, which contains the necessary amount of water. The third chamber 15 is surrounded by a thin, water-tight wall. In order to initiate the exothermic, chemical reaction, it is necessary to destroy the thin wall of the third chamber 15. The following assembly is provided for this purpose, as shown in FIG. 2. Situated above the third chamber 15 there is a holder 17, for instance a metal block, fastened centrally to the base of the container 1. Arranged on the underside of the holder 11 is a plurality of spikes 18, which are able to pierce the thin wall of the chamber 15. These spikes are, however, arranged vertically spaced from the upper wall of the chamber 15 so that they can only pierce the wall when the wall is moved towards the spikes. For this purpose, provided on the base of the thermally insulating jacket 11 there is an opening 14 and the base wall of the lower chamber 5 has an elastic membrane 16 at the location of the opening 14. By manually pressing the membrane 16 inwardly, the water-filled chamber can be moved upwardly so far that the enclosure of the chamber 15 is pressed against the spikes 18. The wall is thus destroyed so that the water can pass out of the chamber 15 into the chamber 5 and mix there with the substance mixture 9. The remaining features of the exemplary embodiment of FIG. 2 substantially correspond to those of the exemplary embodiment of FIG. 1 so that reference may be made to the information above.

FIG. 3 shows a third exemplary embodiment of the transportable apparatus in accordance with the invention for heating food, which is adapted, in particular, for the heating or baking of flat, laminar foodstuffs, such as a pizza. The container 1 is defined by a thermally insulating shell 11, for instance a cardboard box. Located in the interior of the container 1, i.e. on the base of the box, is the closed heating space 2, which is again divided by the steam-permeable wall into a lower chamber 5 and an upper chamber 6. The food 8 to be heated, for instance the pizza which is to be baked, rests on the thermally conductive wall 4, which simultaneously constitutes a wall defining the heating space 2 and a wall of the container 1 (baking space). Located again in the lower chamber 5 is the substance mixture 9 whilst the zeolite 10 is located in the upper chamber 6. In the exemplary embodiment illustrated in FIG. 3, the outer wall of the lower chamber 5 again has a sealable opening 19 for the introduction of water. In an alternative embodiment of the variant shown in FIG. 3, the water can also be accommodated in a water-tight container within the heating space 2, as was described by way of example with reference to the embodiment of FIG. 2.

In order to increase the efficiency of the transfer of the heat from the heating space to the food 8 and to reduce the heat loss, different additional structural features are possible. In addition to the application of thermally insulating layers (for instance layer 11), heat-reflective layers can also be applied to the inner surface of the container 1. For instance, the inner wall of the cardboard box shown in FIG. 3 can be lined with aluminum foil.

The amounts used of the substance mixture 9, the water to be supplied and the zeolite 10 as well as the thickness of the thermal insulation layer 11 are so matched to one another and to the volume of the food 8 that the desired temperature is reached in the container 1 for a predetermined minimum period of time without it being possible for the heating space 2 to burst. By suitable selection of the substance mixture 9 and the water distribution, it can additionally be ensured that local or excessively rapid overheating can occur with an excessive internal pressure cannot occur. An optimum selection of these amounts with predetermined dimensions of the container 1 and volumes of the food 8 to be heated can be determined experimentally in a simple manner.

The laminar heating device including the heating space 2 with the chambers 5 and 6, as rests on the base of the box 1 shown in FIG. 3, in order to heat food 8 resting above it can also find application for other purposes, for instance as a component of a heated cushion or a heatable shoe insert.

The invention claimed is:

1. A transportable apparatus for heating food, comprising: a container for accommodating the food, and
   an enclosed heating space adjoining the container and being thermally coupled to and hermetically separated from the container by a common thermally conductive wall,
   the heating space including a first chamber and a second chamber, which are separated by a steam-permeable wall,
   the first chamber containing a substance or a substance mixture, which, when a liquid is supplied, produces heat in an exothermic chemical reaction, whereby steam is formed, and
   the second chamber containing an adsorption agent, which can adsorb water entering from the first chamber via the steam-permeable wall whilst generating heat.

2. The transportable apparatus for heating food as claimed in claim 1, characterized in that the liquid comprises water.

3. The transportable apparatus for heating food as claimed in claim 2, characterized in that the adsorption agent comprises a zeolite.

4. The transportable apparatus for heating food as claimed in claim 3, characterized in that the steam-permeable wall is constituted by a textile fabric, particularly a non-woven fabric.

5. The transportable apparatus for heating food as claimed in claim 4, characterized in that the textile fabric of the steam-permeable wall is provided on the side directed towards the first chamber with a water-repellent coating or made water-repellent.

6. The transportable apparatus for heating food as claimed in claim 3, comprising
   a third chamber separated from the first and the second chambers and containing the liquid, and
   a device for producing a connection introducing the liquid from the third chamber into the first chamber.

7. The transportable apparatus for heating food as claimed in claim 3, characterized in that when the liquid is supplied, the substance mixture generates further reaction gases in addition to the steam in an exothermic chemical reaction, wherein the steam-permeable wall is permeable also to these reaction gases and wherein the reaction gases are also adsorbed by the zeolite.

8. The transportable apparatus for heating food as claimed in claim 1, characterized in that the thermally conductive wall is situated at at least a portion of the underside of the container.

9. The transportable apparatus for heating food as claimed in claim 1, characterized in that the second chamber is arranged above at least a portion of the first chamber such that the underside of the second chamber is situated above a reaction mixture in the first chamber produced after supply of the liquid.

10. The transportable apparatus for heating food as claimed in claim 9, characterized in that the second chamber is arranged beneath the container and the first chamber is arranged beneath the second chamber and that the first chamber, the second chamber and a base of the container, constituting the thermally conductive wall, have approximately the same horizontal extent and the first chamber and the second chamber have a height which is about 3 to 30% of the external dimensions of the base of the container.

11. The transportable apparatus for heating food as claimed in claim 9, characterized in that the second chamber is arranged in the shape of a ring above the first chamber such that a central region of the first chamber and a ring-shaped region surrounding the central region of the second chamber adjoin one another at a base of the container constituting the thermally conductive wall.

12. The transportable apparatus for heating food as claimed in claim 1, characterized in that the steam-permeable wall is constituted by a textile fabric, particularly a non-woven fabric.

13. The transportable apparatus for heating food as claimed in claim 1, comprising
   a third chamber separated from the first and the second chambers and containing the liquid, and
   a device for producing a connection introducing the liquid from the third chamber into the first chamber.

14. The transportable apparatus for heating food as claimed in claim 13, characterized in that the third chamber is arranged adjacent to the first chamber and separated from it by a liquid-tight wall and that the device for producing a connection introducing the liquid from the third chamber into the first chamber comprises a device for producing an opening in the liquid-tight wall.

15. The transportable apparatus for heating food as claimed in claim 1, characterized in that an outer wall of the first chamber comprises a re-closable opening for introducing the liquid.

16. The transportable apparatus for heating food as claimed in claim 1, characterized in that the substance or the substance mixture in the first chamber comprises calcium oxide.

17. The transportable apparatus for heating food as claimed in claim 16, characterized in that the substance mixture in the first chamber additionally comprises aluminium powder or granulate.

18. The transportable apparatus for heating food as claimed in claim 17, characterized in that the substance mixture in the first chamber additionally comprises sodium carbonate or potassium carbonate.

19. A transportable heating device, comprising:
a hermetically closed heating space adjoining a thermally transmissive outer wall,
the heating space comprising a first chamber and a second chamber, which are separated by a steam-permeable separating device,
the first chamber containing a substance or a substance mixture, which, when a liquid is supplied, produces heat in an exothermic chemical reaction, whereby steam is formed, and
the second chamber containing an adsorption agent, which can adsorb the water entering from the first chamber via the steam-permeable separating device in the form of steam whilst generating heat.

20. The transportable heating device as claimed in claim 19, characterized in that it is of substantially laminar construction in that it has a smaller dimension in a direction perpendicular to a flat or curved surface than the dimension in this surface, wherein the first and/or second chamber extends substantially parallel to the flat or curved surface over the entire heating device or a predominant proportion of it.

21. The transportable heating device as claimed in claim 20, characterized in that the second chamber extends substantially parallel to the flat or curved surface over the entire heating device or a predominant proportion of it and the thermally transmissive outer wall is a wall of the second chamber.

22. The transportable heating device as claimed in claim 19, characterized in that the liquid comprises water and that the adsorption agent is or includes a zeolite.

23. The transportable heating device as claimed in claim 19, characterized in that the steam-permeable separating device comprises a steam-permeable common wall of the first chamber and the second chamber.

24. The transportable heating device as claimed in claim 23, characterized in that the steam-permeable wall is constituted by a textile fabric.

25. The transportable heating device as claimed in claim 19, characterized in that the steam-permeable separating device comprises at least one opening arranged in a common separating wall of the first chamber and the second chamber.

26. The transportable heating device as claimed in claim 25, characterized in that the steam-permeable separating device includes a plurality of openings arranged in the common separating wall, wherein their size is so dimensioned that the substance or the substance mixture and/or the adsorption agent cannot pass from the one chamber into the other.

27. The transportable heating device as claimed in claim 19, comprising
a third chamber containing the liquid and being separated from the first and the second chambers, and
a device for producing a connection introducing the liquid from the third chamber into the first chamber.

28. The transportable heating device as claimed in claim 27, characterized in that the third chamber is arranged adjacent to the first chamber and separated from it by a liquid-tight wall and that the device for producing a connection introducing the liquid from the third chamber into the first chamber comprises a device for producing an opening in the liquid-tight wall.

29. The transportable heating device as claimed in claim 19, characterized in that the heating device is provided for use in a predetermined position and that in this position the second chamber is arranged above at least a proportion of the first chamber such that the underside of the second chamber is situated above a reaction mixture in the first chamber which is produced after supply of the liquid.

30. The transportable heating device as claimed in claim 19, characterized in that the substance or the substance mixture in the first chamber comprises calcium oxide.

31. The transportable heating device as claimed in claim 30, characterized in that the substance mixture in the first chamber additionally comprises aluminium powder or granulate.

* * * * *